(12) United States Patent
Cohen et al.

(10) Patent No.: US 11,106,315 B2
(45) Date of Patent: Aug. 31, 2021

(54) TOUCH SCREEN DEVICE FACILITATING ESTIMATION OF ENTITY ORIENTATION AND IDENTITY

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/204,734

(22) Filed: Nov. 29, 2018

(65) Prior Publication Data

US 2020/0174596 A1 Jun. 4, 2020

(51) Int. Cl.
*G06F 3/044* (2006.01)
*G06K 9/66* (2006.01)
*G06K 9/00* (2006.01)

(52) U.S. Cl.
CPC .......... *G06F 3/044* (2013.01); *G06K 9/0002* (2013.01); *G06K 9/66* (2013.01); *G06F 2203/04104* (2013.01)

(58) Field of Classification Search
CPC .......... G06F 3/044; G06F 2203/04104; G06K 9/0002; G06K 9/66
See application file for complete search history.

(56) References Cited

U.S. PATENT DOCUMENTS

| | | | |
|---|---|---|---|
| 7,239,947 B2 * | 7/2007 | Suzuki | G01C 21/3664 701/36 |
| 8,760,432 B2 | 6/2014 | Jira et al. | |
| 9,477,332 B2 | 10/2016 | Cuddihy et al. | |
| 10,281,990 B2 * | 5/2019 | Salter | G06F 3/017 |
| 2003/0132922 A1 | 7/2003 | Philipp | |
| 2009/0225036 A1 * | 9/2009 | Wright | G06F 3/0445 345/173 |
| 2012/0068956 A1 | 3/2012 | Jira et al. | |

(Continued)

OTHER PUBLICATIONS

Wang, et al., Carpacio: Repurposing Capacitive Sensors to Distinguish Driver and Passenger Touches on In-Vehicle Screens. In Proceedings of the 30th Annual ACM Symposium on User Interface Software and Technology, Oct. 22, 2017, 7 pages.

(Continued)

*Primary Examiner* — Stacy Khoo
(74) *Attorney, Agent, or Firm* — Amin, Turocy & Watson, LLP

(57) ABSTRACT

Devices, systems, computer-implemented methods, and computer program products that can facilitate estimating orientation and/or identity of an entity that touches a touch screen device are provided. According to an embodiment, a device can comprise a pixelated touch screen that provides a two-dimensional capacitance map in response to detection of one or more entities touching the pixelated touch screen. Capacitance data of the two-dimensional capacitance map is inversely proportional to a distance between fingers of the one or more entities and the pixelated touch screen. The device can further comprise a processor that applies an analytic method to the two-dimensional capacitance map to estimate orientation or identity of the one or more entities.

20 Claims, 11 Drawing Sheets

(56) References Cited

U.S. PATENT DOCUMENTS

| | | | |
|---|---|---|---|
| 2013/0176275 A1* | 7/2013 | Weaver | G06F 3/0416 |
| | | | 345/174 |
| 2014/0293086 A1* | 10/2014 | Ugawa | G06F 3/0488 |
| | | | 348/222.1 |
| 2015/0268746 A1 | 9/2015 | Cuddihy et al. | |
| 2015/0363585 A1* | 12/2015 | Gooding | G06K 9/0002 |
| | | | 726/19 |
| 2017/0090666 A1* | 3/2017 | Pahud | G06F 3/0416 |
| 2017/0220142 A1* | 8/2017 | Kang | G06F 3/044 |
| 2018/0157329 A1 | 6/2018 | Salter et al. | |
| 2019/0380621 A1* | 12/2019 | Ando | B25J 19/02 |

OTHER PUBLICATIONS

Herrmann, et al., Hand-movement-based in-vehicle driver/front-seat passenger discrimination for centre console controls, Proceedings of SPIE—The International Society for Optical Engineering, Feb. 8, 2010, 10 pages.

Herrmann, et al., Driver/passenger discrimination for the interaction with the dual-view touch screen integrated to the automobile centre console, Proceedings of SPIE—The International Society for Optical Engineering, Feb. 2, 2012, 10 pages.

* cited by examiner

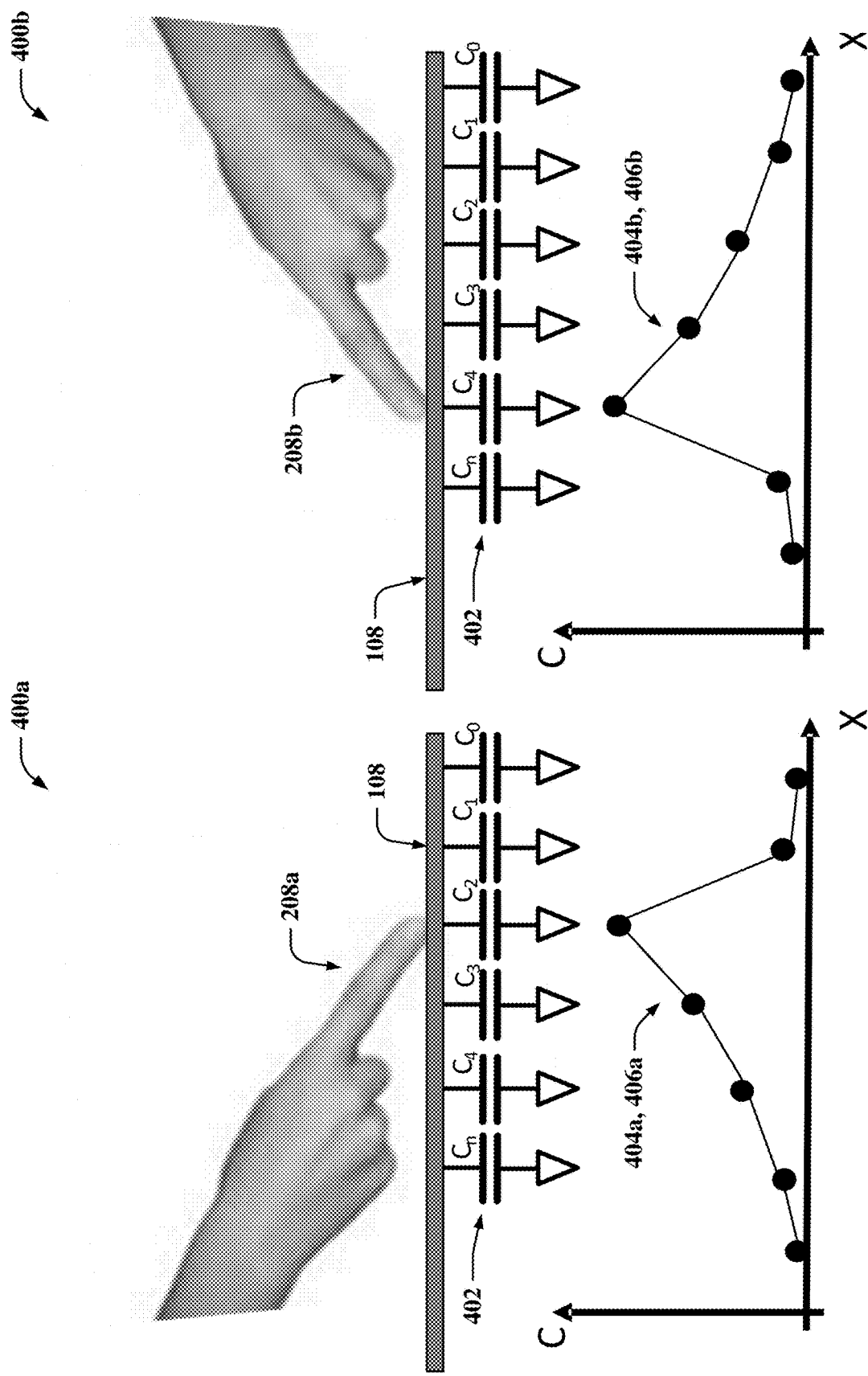

900

902 — Facilitating an estimation of entity orientation or identity process, using a hardware capable of performing a computation on input data in the form of a two-dimensional capacitance map obtained in response to detection of one or more entities touching a pixelated touch screen, wherein capacitance data of the two-dimensional capacitance map is inversely proportional to a distance between fingers of the one or more entities and the pixelated touch screen, and wherein the hardware output response to the two-dimensional capacitance map is an estimate of the orientation or identity of the one or more entities.

FIG. 9

TOUCH SCREEN DEVICE FACILITATING ESTIMATION OF ENTITY ORIENTATION AND IDENTITY

BACKGROUND

The subject disclosure relates to touch screen devices, and more specifically, to a touch screen device that can estimate orientation and/or identity of an entity that touches such a touch screen device.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate estimating orientation and/or identity of an entity that touches a touch screen device are described.

According to an embodiment, a device can comprise a pixelated touch screen that provides a two-dimensional capacitance map in response to detection of one or more entities touching the pixelated touch screen. Capacitance data of the two-dimensional capacitance map is inversely proportional to a distance between fingers of the one or more entities and the pixelated touch screen. The device can further comprise a processor that applies an analytic method to the two-dimensional capacitance map to estimate orientation or identity of the one or more entities.

According to another embodiment, a computer-implemented method can comprise providing, by an input-output device operatively coupled to a processor, a two-dimensional capacitance map in response to detection of one or more entities touching a pixelated touch screen. Capacitance data of the two-dimensional capacitance map is inversely proportional to a distance between fingers of the one or more entities and the pixelated touch screen. The computer-implemented method can further comprise applying, by the input-output device, an analytic method to the two-dimensional capacitance map to estimate orientation or identity of the one or more entities.

According to another embodiment, a computational method is provided. The computational method, comprises: facilitating an estimation of entity orientation or identity process, using a hardware capable of performing a computation on input data in the form of a two-dimensional capacitance map obtained in response to detection of one or more entities touching a pixelated touch screen, wherein capacitance data of the two-dimensional capacitance map is inversely proportional to a distance between fingers of the one or more entities and the pixelated touch screen, and wherein the hardware output response to the two-dimensional capacitance map is an estimate of the orientation or identity of the one or more entities.

DESCRIPTION OF THE DRAWINGS

FIGS. 4A and 4B illustrate example, non-limiting systems that can facilitate estimation of entity orientation and/or identity components in accordance with one or more embodiments described herein.

FIG. 9 illustrates a flow diagram of an example, non-limiting computer-implemented method that can facilitate estimation of entity orientation and/or identity components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
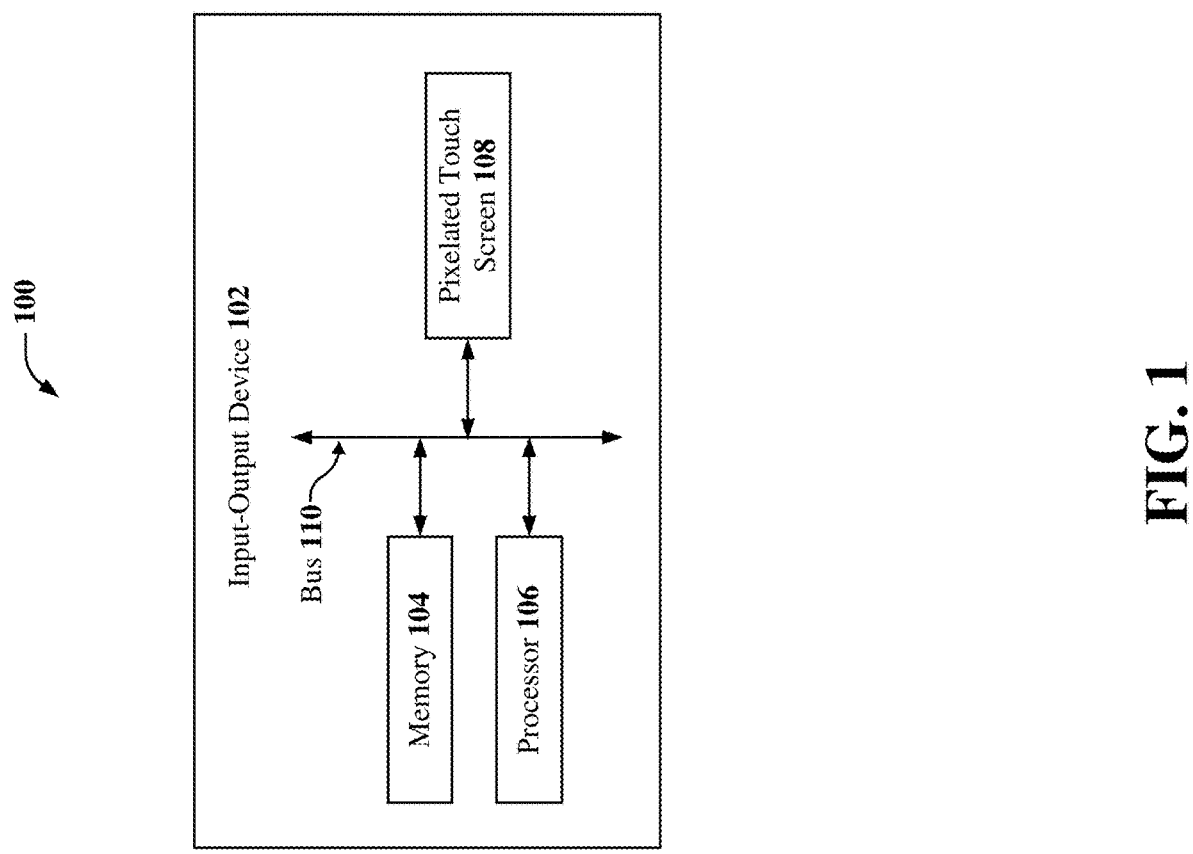
FIG. 1 illustrates a block diagram of an example, non-limiting system that can facilitate estimation of entity orientation and/or identity components in accordance with one or more embodiments described herein.

FIG. 1 illustrates a block diagram of an example, non-limiting system 100 that can facilitate estimation of entity orientation and/or identity components in accordance with one or more embodiments described herein. According to several embodiments, system 100 can comprise an input-output device 102. In some embodiments, input-output device 102 can comprise a memory 104, a processor 106, a pixelated touch screen 108, and/or a bus 110.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or input-output device 102 can further comprise various computer and/or computing-based elements described herein with reference to operating environment 1000 and FIG. 10. Furthermore, in some embodiments, input-output device 102 can comprise an artificial intelligence (AI) processor that can be trained to recognize patterns and/or features in a two-dimensional capacitance map produced by an entity's touch of pixelated touch screen 108 (e.g., as described below with reference to learning component 702 and FIG. 7). In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to input-output device 102, pixelated touch screen 108, and/or another component associated with input-output device 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. In some embodiments, processor 106 can comprise an AI accelerator such as, for example, a neural network co-processor that can be used to train and/or infer. Further examples of processor 106 are described below with reference to processing unit 1014 and FIG. 10. Such examples of processor 106 can be employed to implement any embodiments of the subject disclosure.

In some embodiments, input-output device 102, memory 104, processor 106, pixelated touch screen 108, and/or another component of input-output device 102 as described herein can be communicatively, electrically, and/or operatively coupled to one another via a bus 110 to perform functions of system 100, input-output device 102, and/or any components coupled therewith. In several embodiments, bus 110 can comprise one or more memory bus, memory controller, peripheral bus, external bus, local bus, and/or another type of bus that can employ various bus architectures. Further examples of bus 110 are described below with reference to system bus 1018 and FIG. 10. Such examples of bus 110 can be employed to implement any embodiments of the subject disclosure.

In some embodiments, input-output device 102 can comprise any type of component, machine, device, facility, apparatus, and/or instrument that comprises a processor and/or can be capable of effective and/or operative communication with a wired and/or wireless network. All such embodiments are envisioned. For example, input-output device 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, input-output device 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, input-output device 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, input-output device 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, input-output device 102 can thus include hardware (e.g., a central processing unit (CPU), a transceiver, a decoder), software (e.g., a set of threads, a set of processes, software in execution) or a combination of hardware and software that facilitates communicating information between input-output device 102 and external systems, sources, and/or devices (e.g., computing devices, communication devices, etc.).

According to multiple embodiments, input-output device 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with input-output device 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, pixelated touch screen 108 and/or any other components associated with input-output device 102 as disclosed herein (e.g., communicatively, electronically, and/or operatively coupled with and/or employed by input-output device 102), can comprise such computer and/or machine readable, writable, and/or executable component(s) and/or instruction(s). Consequently, according to numerous embodiments, input-output device 102 and/or any components associated therewith as disclosed herein, can employ processor 106 to execute such computer and/or machine readable, writable, and/or executable component(s) and/or instruction(s) to facilitate performance of one or more operations described herein with reference to input-output device 102 and/or any such components associated therewith.

In some embodiments, to implement one or more estimation of an entity orientation and/or identity operations, input-output device 102 can facilitate performance of operations executed by and/or associated with pixelated touch screen 108 and/or another component associated with input-output device 102 as disclosed herein. For example, as described in detail below, input-output device 102 can facilitate: providing a two-dimensional capacitance map in response to detection of one or more entities touching a pixelated touch screen, where capacitance data of the two-dimensional capacitance map can be inversely proportional to a distance between fingers of the one or more entities and the pixelated touch screen; applying an analytic method to the two-dimensional capacitance map to estimate orientation and/or identity of the one or more entities; applying an analytic method including, but not limited to, a signal processing analysis, a principal component analysis, a first principles analysis, a machine learning model, and/or an imaging analysis to estimate orientation and/or identity of the one or more entities; applying machine learning to determine over time the identity of the one or more entities; applying the analytic method to the two-dimensional capacitance map to estimate the orientation and/or the identity of the one or more entities based on one or more characteristics of the two-dimensional capacitance map; applying the analytic method to the two-dimensional capacitance map to estimate one or more characteristics of the one or more entities based on one or more characteristics of the two-dimensional capacitance map; and/or executing an operation based on the orientation and/or the identity of the one or more entities.

Figures 5A, 5B:
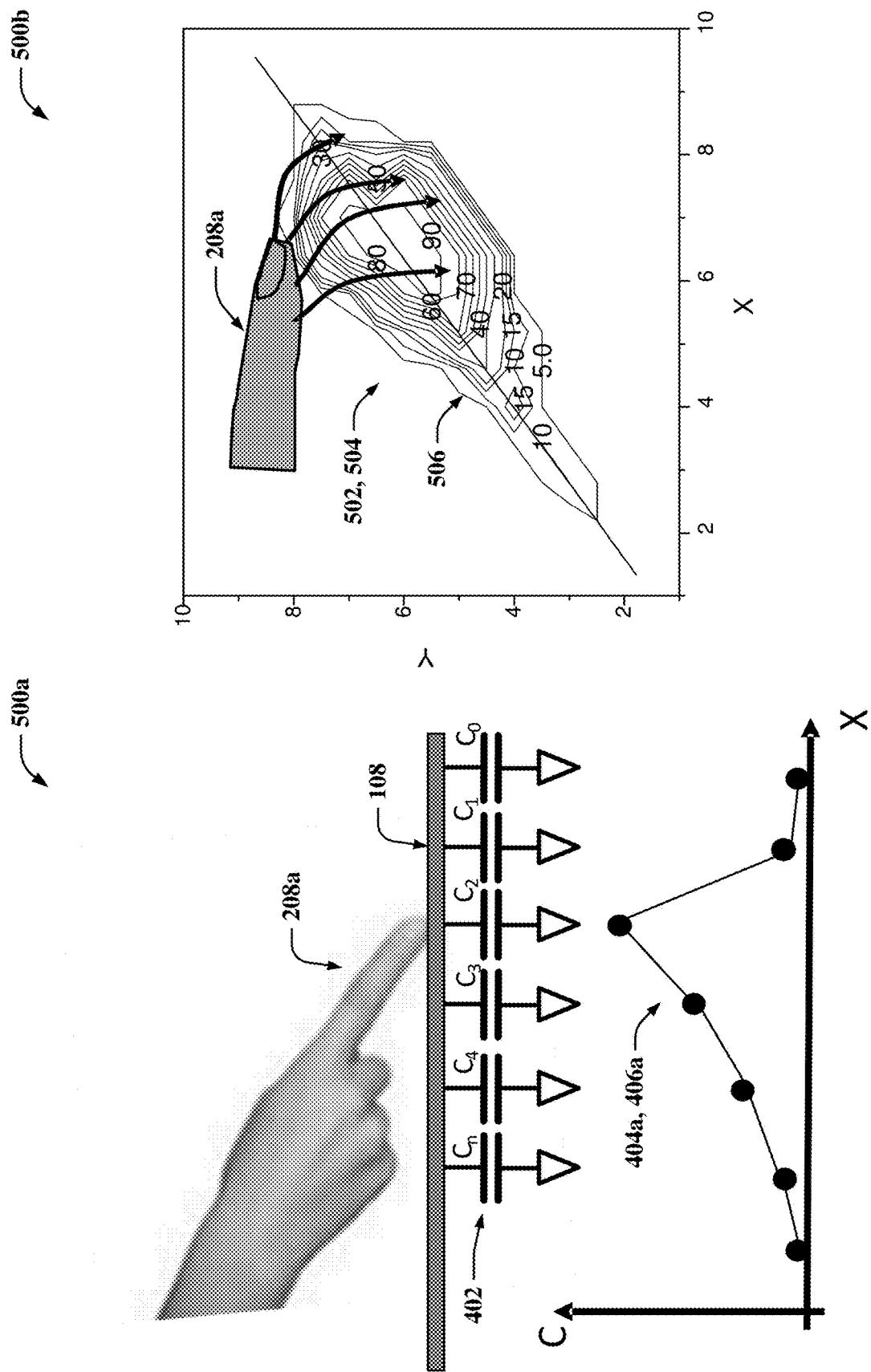
FIGS. 5A and 5B illustrate example, non-limiting systems that can facilitate estimation of entity orientation and/or identity components in accordance with one or more embodiments described herein.

According to multiple embodiments, pixelated touch screen 108 can provide a capacitance line plot and/or a capacitance map in response to detection of one or more entities touching pixelated touch screen 108, where capacitance data of the capacitance line plot and/or capacitance map can be inversely proportional to a distance between fingers of the one or more entities and pixelated touch screen 108. For example, pixelated touch screen 108 can provide a capacitance line plot (e.g., capacitance line plot 404a, 404b described below and illustrated in FIGS. 4A and 4B) and/or a capacitance map (e.g., capacitance map 502 described below and illustrated in FIG. 5B) in response to detection of one or more entities (e.g., entity 206a and/or entity 206b illustrated in FIGS. 2 and 3) touching pixelated touch screen 108. In some embodiments, such capacitance line plot and/or capacitance map can comprise capacitance data (e.g., capacitance data 406a, 406b and/or capacitance data 504 described below and illustrated in FIGS. 4A, 4B, and 5B, respectively) that can be inversely proportional to a distance between fingers of the one or more entities and pixelated touch screen 108 (e.g., as illustrated in FIGS. 4A, 4B, and 5B).

According to multiple embodiments, based on pixelated touch screen 108 providing a capacitance map (e.g., as described above), processor 106 can apply one or more analytic methods to the capacitance map to estimate orientation and/or identity of one or more entities that touched pixelated touch screen 108. For example, processor 106 can apply an analytic method to estimate orientation and/or identity of one or more entities that touched pixelated touch screen 108, where the capacitance map and/or capacitance data of such capacitance map can serve as inputs to such an analytic method to estimate orientation and/or identity of such one or more entities.

In some embodiments, processor 106 can apply one or more analytic methods that can comprise computer and/or machine readable, writable, and/or executable component(s) and/or instruction(s) that can be stored in a memory. For example, input-output device 102 can employ processor 106 to execute one or more analytic methods comprising computer and/or machine readable, writable, and/or executable component(s) and/or instruction(s) stored in memory 104 to estimate orientation and/or identity of one or more entities that touched pixelated touch screen 108. For instance, input-output device 102 can employ processor 106 to execute one or more analytic methods including, but not limited to, a signal processing analysis, a principal component analysis, a first principles analysis, a machine learning model, an imaging analysis, and/or another analytic method.

In some embodiments, by employing one or more analytic methods described herein, utilizing a capacitance map and/or capacitance data of the capacitance map as inputs, input-output device 102 (e.g., via processor 106) can estimate the orientation and/or the identity of the one or more entities based on one or more characteristics of the capacitance map (e.g., as described below). In some embodiments, by employing one or more analytic methods described herein, utilizing a capacitance map and/or capacitance data of the capacitance map as inputs, input-output device 102 (e.g., via processor 106) can estimate one or more characteristics of the one or more entities based on one or more characteristics of the capacitance map (e.g., as described below).

In some embodiments, input-output device 102 can employ processor 106 to execute a signal processing analytic method utilizing the capacitance map and/or capacitance data of the capacitance map provided by pixelated touch screen 108 to estimate orientation and/or identity of one or more entities that touched pixelated touch screen 108. For example, input-output device 102 can employ processor 106 to maintain signals (e.g., capacitance data) above a certain threshold and perform Principal Component Analysis over the remaining points of the capacitance map, where the first two (2) eigenvectors can describe the primary pointing direction (e.g., maximal variability and/or spread along the finger length) and the width of the finger (e.g., which can be used to identify a certain finger and/or a certain person that touched pixelated touch screen 108). In another example, input-output device 102 can employ processor 106 to: apply a low pass filter to a signal (e.g., capacitance data); compute 2D gradients of the capacitance map; and perform Principal Component Analysis over the capacitance map gradient, where the primary point direction (e.g., maximal variability and/or spread along the finger length) can be identified as one orthogonal to the one given by the gradient map.

In some embodiments, input-output device 102 can employ processor 106 to execute a data-driven analytic method (e.g., a machine learning model) utilizing the capacitance map and/or capacitance data of the capacitance map provided by pixelated touch screen 108 to estimate orientation and/or identity of one or more entities that touched pixelated touch screen 108. For example, input-output device 102 can employ processor 106 to provide a set of training instances comprising different entities (e.g., human users), performing different tasks (e.g., pointing at different locations on pixelated touch screen 108) from different orientations, where such training instances can be learned by learning component 702 (e.g., as described below with reference to FIG. 7). In this example, the set of training instances can constitute input in the form of capacitance maps and respective output in the form of orientations, displacement on pixelated touch screen 108, and/or entity characteristics (e.g., width of fingers, skin moisture level, etc.). In this example, input-output device 102 can employ processor 106 to input such training instances data into a machine learning model (e.g. learning component 702 comprising a neural network) to train such a model to infer (e.g., estimate) the orientation and/or identity of one or more entities that touched pixelated touch screen 108, based on input in the form of capacitance signature (e.g., the capacitance map and/or capacitance data of the capacitance map provided by pixelated touch screen 108). In this example, input-output device 102 can employ processor 106 to execute pre-processing of such training instances data (e.g., filtering and/or parameter extraction), which can enhance the learning process and/or the learning model.

In some embodiments, input-output device 102 can employ processor 106 to execute an imaging based analytic method utilizing the capacitance map and/or capacitance data of the capacitance map provided by pixelated touch screen 108 to estimate orientation and/or identity of one or more entities that touched pixelated touch screen 108. For example, input-output device 102 can employ processor 106 to form a model (e.g., a first principles model, a data-driven model, hybrid thereof, etc.) of the response of pixelated touch screen 108 to touching instances by one or more entities positioned in various orientations, having various hand and/or finger sizes, and therefore various hand capacitance characteristics. In this example, the representation of the interaction with pixelated touch screen 108 (e.g., the capacitance map and/or the capacitance data of the capacitance map) can have parametric representation (e.g. parametric description of the shape and/or orientation of the hand) In this example, based on a certain capacitance map provided by pixelated touch screen 108, input-output device 102 can employ processor 106 to seek parameters (e.g., characteristics of the capacitance map indicative of hand orientation, displacement, moisture characteristics, etc.) that when input to the model formed above (e.g., a first principles model, a data-driven model, hybrid thereof, etc.) can provide a capacitance map that is closest to the capacitance map observed (e.g. by maximum likelihood considerations). In this example, there can be a strong prior regarding the parameters inferred, as most hands and finger pointing, looks somewhat similar, in a manner that can be characterizable. In this example, such considerations can be encoded as a prior to the inference problem described above such that the eventual inferred parameters balance between proper fit of the data (e.g., the capacitance map and/or the capacitance data of the capacitance map) and the prior knowledge. In this example, such encoding can be performed utilizing a Bayesian method, for instance, by finding a Maximum a-Posteriori estimate.

Figure 2:
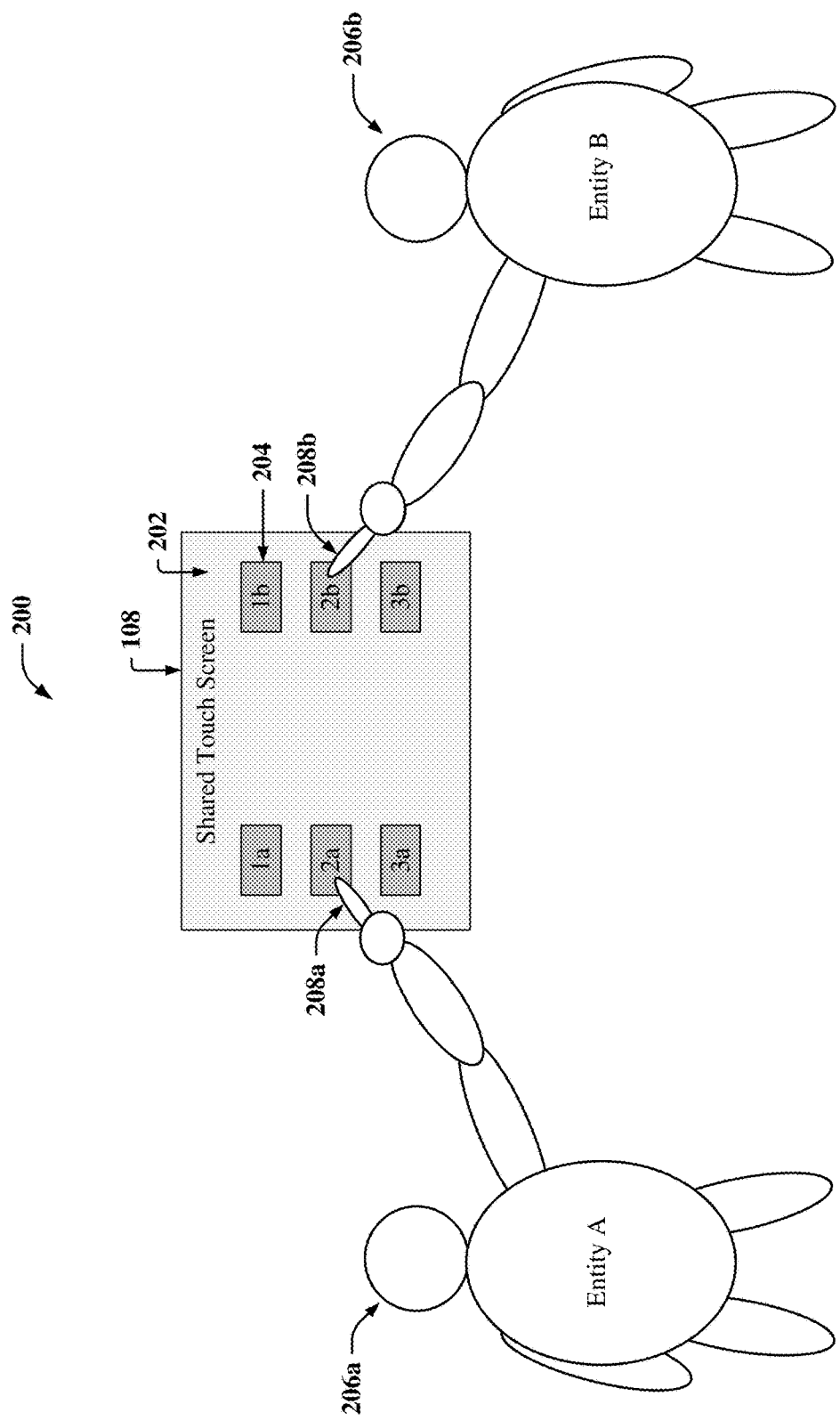
FIG. 2 illustrates a block diagram of an example, non-limiting system that can facilitate estimation of entity orientation and/or identity components in accordance with one or more embodiments described herein.

FIG. 2 illustrates a block diagram of an example, non-limiting system 200 that can facilitate estimation of entity orientation and/or identity components in accordance with one or more embodiments described herein. Repetitive description of like elements and/or processes employed in various embodiments described herein is omitted for sake of brevity.

In some embodiments, system 200 can comprise an alternative, non-limiting example embodiment of input-output device 102, where system 200 can comprise pixelated touch screen 108 (e.g., denoted as Shared Touch Screen in FIG. 2). In such embodiments, pixelated touch screen 108 can comprise a user interface 202, which can comprise one or more input controls 204 that can be utilized by one or more entities 206a, 206b, for example, using one or more fingers 208a, 208b of such one or more entities 206a, 206b. In these embodiments, one or more fingers 208a, for example, can constitute one or more fingers of a certain entity (e.g., entity 206a), while one or more fingers 208b, for example, can constitute one or more fingers of a different entity (e.g., entity 206b).

According to multiple embodiments, pixelated touch screen 108 can comprise any type of pixelated touch screen that can facilitate one or more operations executed by pixelated touch screen 108 as described herein. For example, pixelated touch screen 108 can comprise a pixelated touch screen including, but not limited to: a capacitance touch screen; a surface capacitance touch screen; a projected capacitance touch screen; a capacitance sensing touch-based input device; a capacitance sensing touch display; a capacitance sensing touch monitor; a capacitance sensing touch pad; and/or another pixelated touch screen.

In some embodiments, system 200 and/or pixelated touch screen 108 can be implemented in a variety of systems, where pixelated touch screen 108 can be utilized simultaneously by more than one entity. For example, system 200 and/or pixelated touch screen 108 can be implemented in a vehicle control panel system (e.g., in a car dashboard, located between the driver and the passenger) and/or in a video game system. In these examples, system 200 and/or pixelated touch screen 108 can be used simultaneously by multiple entities, for example, entities 206a, 206b (e.g., human users). In some embodiments, for instance, where system 200 and/or pixelated touch screen 108 are implemented in a vehicle control panel system such as, for example, a car dashboard, system 200 and/or pixelated touch screen 108 can be used to control one or more systems of the car including, but not limited to, an entertainment system (e.g. radio, video, etc.), a communication system (e.g., Bluetooth, data communication, etc.), a navigation system (e.g., Global Positioning System (GPS) navigation), an internal climate control system, an ergonomic system (e.g., seat positioning, steering wheel positioning, mirror positioning, etc.), and/or another system. In these embodiments, entity 206a can be a driver of such a vehicle, while entity 206b, can be a passenger (e.g., assuming a driving convention such as, for instance, practiced in a particular region of the world).

According to multiple embodiments, user interface 202 can comprise any type of user interface that can be implemented via pixelated touch screen 108. For example, user interface 202 can comprise a Graphical User Interface (GUI) that can comprise input controls 204. In some embodiments, input controls 204 can comprise any type of input controls that can be implemented via pixelated touch screen 108. For example, input controls 204 can comprise input controls including, but not limited to, buttons (e.g., push buttons), zoom buttons, toggle buttons, text fields, checkboxes, seek bars, and/or another input control.

In some embodiments, for instance, where system 200 and/or pixelated touch screen 108 are implemented in a vehicle control panel system (e.g., a car dashboard), input controls 204 can be utilized by entities 206a, 206b (e.g., via fingers 208a, 208b) to input commands to system 200 and/or input-output device 102. For example, input controls 204 (e.g., denoted as 1a, 2a, 3a, 1b, 2b, and 3b in FIG. 2) can be utilized by entities 206a, 206b to control one or more systems of a car. For instance, input controls 204 (e.g., denoted as 1a, 2a, 3a, 1b, 2b, and 3b in FIG. 2) can be utilized by entities 206a, 206b to control the internal climate of a car (e.g., temperature, fan speed, etc.) and/or ergonomic settings of various car features (e.g., a seat(s), steering wheel, mirror(s), etc.).

In some embodiments, some input controls 204 can be designated as driver and/or driver side input controls (e.g., 1a, 2a, and 3a in FIG. 2), while other input controls 204 can be designated as passenger and/or passenger side input controls (e.g., 1b, 2b, and 3b in FIG. 2). In such embodiments, based on an entity (e.g., entity 206a and/or entity 206b) touching pixelated touch screen 108 (e.g., touching input controls 204), pixelated touch screen 108 can generate a capacitance map comprising capacitance data that can constitute a capacitance signature that can be used by system 200, input-output device 102, and/or processor 106 to estimate orientation (e.g., front seat, back seat, etc.) and/or identity (e.g., entity 206a or entity 206b) of the entity or entities that touched pixelated touch screen 108 (e.g., as described above with reference to FIG. 1). For example, although some input controls 204 can be designated as driver and/or driver side input controls (e.g., 1a, 2a, and 3a in FIG. 2) and other input controls 204 can be designated as passenger and/or passenger side input controls (e.g., 1b, 2b, and 3b in FIG. 2), system 200, input-output device 102, and/or processor 106 can estimate the identity of the entity (or entities) that touched pixelated touch screen 108 (e.g., as described above with reference to FIG. 1). In this example, such identification can facilitate execution of an operation based on predefined parameters corresponding to a certain entity. For instance, such identification can facilitate execution of a climate control operation such as, for example, temperature control, fan speed control, and/or the like, where such climate control operation can be based on parameters (e.g., temperature, fan speed, etc.) that can be predefined for a certain entity (or entities). In this example, based on such identification, execution of an operation (e.g., temperature control, fan speed control, etc.) based on predefined parameters corresponding to a certain entity can be facilitated (e.g., as described below with reference to operation component 602 and FIG. 6) by system 200, input-output device 102, and/or processor 106 regardless of whether the entity (or entities) touch driver side input controls (e.g., 1a, 2a, and 3a in FIG. 2) or passenger side input controls (e.g., 1b, 2b, and 3b in FIG. 2).

Figure 3:
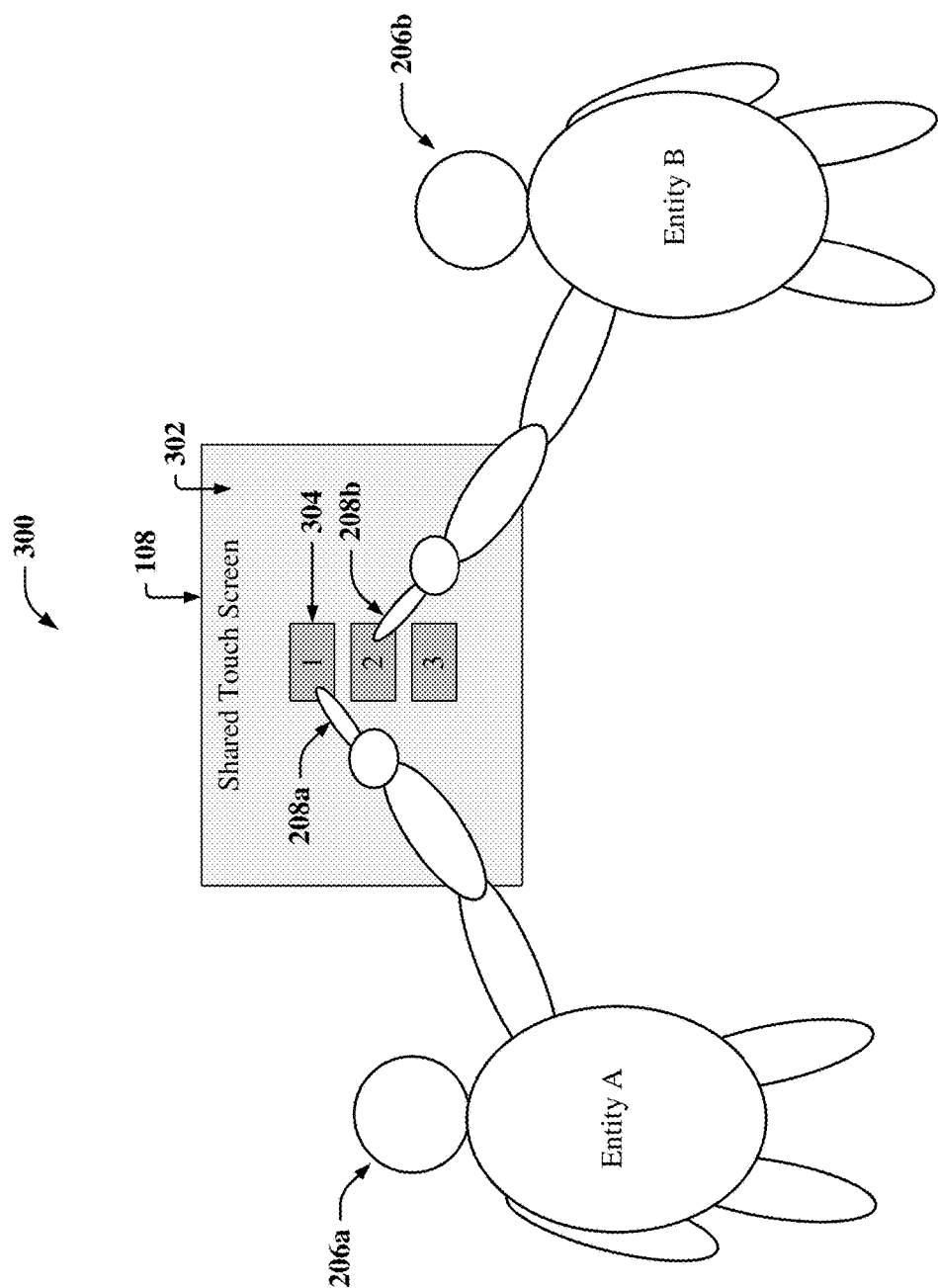
FIG. 3 illustrates a block diagram of an example, non-limiting system that can facilitate estimation of entity orientation and/or identity components in accordance with one or more embodiments described herein.

FIG. 3 illustrates a block diagram of an example, non-limiting system 300 that can facilitate estimation of entity orientation and/or identity components in accordance with one or more embodiments described herein. Repetitive description of like elements and/or processes employed in various embodiments described herein is omitted for sake of brevity. In some embodiments, system 300 can comprise only one (1) set of GUI inputs (e.g., input controls 304 described below), and by estimating which entity entered the input, system 300 can act upon the input.

In some embodiments, system 300 can comprise an alternative, non-limiting example embodiment of system 200 and/or input-output device 102. In such embodiments, system 300 can comprise pixelated touch screen 108 (e.g., denoted as Shared Touch Screen in FIG. 3) comprising a user interface 302 instead of user interface 202, where user interface 302 can comprise one or more input controls 304 instead of input controls 204. In such embodiments, for example, as illustrated in the embodiment depicted in FIG. 3, user interface 302 (e.g., a GUI) can comprise input controls 304 (e.g., buttons (e.g., push buttons), zoom buttons, toggle buttons, text fields, checkboxes, seek bars, etc.) that are not designated for driver and/or driver side use or passenger and/or passenger side use. For instance, input controls 304 (e.g., denoted 1, 2, and 3 in FIG. 3) can comprise a single set of input controls (e.g., as opposed to duplicate input controls such as, for example, input controls 204 of FIG. 2). For example, input controls 304 can comprise universal input controls that can be utilized by any vehicle occupant (e.g., driver, passenger, etc.) to execute one or more operations (e.g., climate control, ergonomics control, communication control, navigation controls, etc.) of one or more systems of a vehicle (e.g., entertainment system, communication system, navigation system, climate control system, ergonomic system, etc.).

In some embodiments, based on an entity (e.g., entity 206a and/or entity 206b) touching pixelated touch screen 108 (e.g., touching input controls 304), pixelated touch screen 108 can generate a capacitance map comprising capacitance data that can constitute a capacitance signature that can be used by system 300, input-output device 102, and/or processor 106 to estimate orientation (e.g., driver side, passenger side, front seat, back seat, etc.) and/or identity (e.g., entity 206a or entity 206b) of the entity or entities that touched pixelated touch screen 108 (e.g., as described above with reference to FIG. 1). For example, although input controls 304 can comprise input controls that are not designated for driver and/or driver side use or passenger and/or passenger side use (e.g., universal input controls), system 300, input-output device 102, and/or processor 106 can estimate orientation and/or identity of the entity (or entities) that touched pixelated touch screen 108 (e.g., as described above with reference to FIG. 1). In this example, such an estimation of entity orientation and/or identification can facilitate (or prohibit) execution of an operation based on predefined parameters corresponding to a certain location in the vehicle (e.g., driver side, passenger side, front seat, back seat, etc.) and/or a certain entity (e.g., entity 206a or entity 206b). For instance, such estimation of entity orientation and/or identification can facilitate (or prohibit) execution of an ergonomic controls operation. For example, system 300, input-output device 102, and/or processor 106 can estimate the orientation and/or identity of an entity that touched pixelated touch screen 108 to be that of a passenger sitting in the back seat, on the driver side. In this example, such estimation of entity orientation and/or identification can prevent such passenger from changing, for example, ergonomic settings of various vehicle components that affect the driver and/or the driver's ability to operate the vehicle safely (e.g., driver seat positioning, mirror positioning, steering wheel positioning, etc.).

FIGS. 4A and 4B illustrate example non-limiting systems 400a and 400b, respectively, that can facilitate estimation of entity orientation and/or identity components in accordance with one or more embodiments described herein. Repetitive description of like elements and/or processes employed in various embodiments described herein is omitted for sake of brevity.

In some embodiments, system 400a and 400b can comprise pixelated touch screen 108. In such embodiments, pixelated touch screen 108 can comprise one or more capacitors 402 (e.g., denoted as $C_0$, $C_1$, $C_2$, $C_3$, $C_4$, to $C_n$, where "n" represents a total quantity of capacitors participating in the sensing of the touch).

In some embodiments, capacitance data 406a, 406b can comprise capacitance readout values of each pixel (e.g., at coordinate (x,y)) of pixelated touch screen 108, where such capacitance readout values can be related to a capacitance induced by a finger (e.g., fingers 208a, 208b) of an entity (e.g., entities 206a, 206b) that touches pixelated touch screen 108. In such embodiments, capacitance readout values of each pixel of pixelated touch screen 108 can be high at the physical touch location and can taper off as the distance between the finger (e.g., fingers 208a, 208b) and pixelated touch screen 108 increases (e.g., as illustrated in FIGS. 4A and 4B). In some embodiments, the rate by which such capacitance readout values can decrease away from the touch point is not symmetric. For example, such capacitance readout values can drop more gradually in the direction that leads to a palm of the entity (e.g., entities 206a, 206b) that touched pixelated touch screen 108. In this example, such a gradual decrease is a result of capacitance induced by the body of the finger (e.g., fingers 208a, 208b). In some embodiments, the capacitance readout values can constitute a capacitance line plot (also referred to herein as a capacitance profile and/or a capacitance readout profile). In some embodiments, such capacitance line plot (e.g., capacitance line plots 404a, 404b described below) can comprise capacitance readout values that, as a function of location, can be different if the entity touches pixelated touch screen 108 from the left side or from the right side (e.g., as illustrated in FIGS. 4A and 4B). In such embodiments, based on such capacitance line plots (e.g., capacitance line plots 404a, 404b), input-output device 102 can determine whether the touching finger (e.g., fingers 208a, 208b) is that of entity 206a or entity 206b.

In some embodiments, pixelated touch screen 108 of system 400a (FIG. 4A) can generate (e.g., via capacitors 402) a capacitance line plot, which can comprise a capacitance readout profile as described above. For example, pixelated touch screen 108 of system 400a can generate a capacitance line plot 404a illustrated in FIG. 4A, where the x-axis of such a plot can represent a location along such x-axis and the y-axis (e.g., denoted as C in FIG. 4A) can represent a capacitance value.

In some embodiments, pixelated touch screen 108 of system 400a can generate (e.g., via capacitors 402) a capacitance line plot comprising an array of capacitance data based on pixelated touch screen 108 detecting a touch by finger 208a of entity 206a (e.g., entity 206a illustrated in FIGS. 2 and 3), where such capacitance data can comprise several formats. For example, pixelated touch screen 108 of system 400a can generate an array of capacitance data including, but not limited to, a list of capacitance measurements taken at one or more pixel locations (e.g., at coordinates (x,y) of a capacitance line plot and/or a capacitance map), a contour plot representing the capacitance measurement (e.g., as illustrated in FIG. 5B), and/or other capacitance data.

In some embodiments, capacitance line plot 404a provided by pixelated touch screen 108 can comprise capacitance data 406a that can be utilized by input-output device 102 and/or processor 106 to estimate (e.g., as described above with reference to FIG. 1) orientation and/or identity of the entity (e.g., entity 206a) that touched pixelated touch screen 108. For example, capacitance data 406a can comprise capacitance readout values of each pixel of pixelated touch screen 108 as determined by capacitors 402, where such values are inversely proportional to a distance between finger 208a and pixelated touch screen 108 (e.g., as illustrated by the changing slope of capacitance line plot 404a between capacitor $C_n$ and capacitor $C_0$ depicted in FIG. 4A).

In the embodiment depicted in FIG. 4A, based on capacitance line plot 404a and/or capacitance data 406a, input-output device 102 and/or processor 106 can estimate the orientation of entity 206a and/or finger 208a to be to the left of pixelated touch screen 108, as the slope of capacitance line plot 404a between capacitor $C_n$ and capacitor $C_2$ is gradual, while the slope of capacitance line plot 404a between capacitor $C_2$ and capacitor $C_1$ is steep. In this embodiment, the location of such a gradual slope and steep slope of capacitance line plot 404a can be indicative of orientation of entity 206a and/or finger 208a.

Conversely, in some embodiments, pixelated touch screen 108 of system 400b (FIG. 4B) can generate (e.g., via capacitors 402) a capacitance line plot 404b comprising capacitance data 406b based on pixelated touch screen 108 detecting a touch by finger 208b of entity 206b (e.g., entity 206b illustrated in FIGS. 2 and 3). For example, pixelated touch screen 108 of system 400b can generate capacitance line plot 404b, which can comprise an example, non-limiting alternative embodiment of capacitance line plot 404a described above.

In some embodiments, capacitance line plot 404b provided by pixelated touch screen 108 can comprise capacitance data 406b that can be utilized by input-output device 102 and/or processor 106 to estimate (e.g., as described above with reference to FIG. 1) orientation and/or identity of the entity (e.g., entity 206b) that touched pixelated touch screen 108. For example, capacitance data 406b can comprise capacitance readout values of each pixel of pixelated touch screen 108 as determined by capacitors 402, where such values are inversely proportional to a distance between finger 208b and pixelated touch screen 108 (e.g., as illustrated by the changing slope of capacitance line plot 404b between capacitor $C_n$ and capacitor $C_0$ depicted in FIG. 4B).

In the embodiment depicted in FIG. 4B, based on capacitance line plot 404b and/or capacitance data 406b, input-output device 102 and/or processor 106 can estimate the orientation of entity 206b and/or finger 208b to be to the right of pixelated touch screen 108, as the slope of capacitance line plot 404b between capacitor $C_4$ and capacitor $C_0$ is gradual, while the slope of capacitance line plot 404b between capacitor $C_n$ and capacitor $C_4$ is steep. In this embodiment, the location of such a gradual slope and steep slope of capacitance line plot 404b can be indicative of orientation of entity 206b and/or finger 208b.

FIGS. 5A and 5B illustrate example, non-limiting systems 500a and 500b, respectively, that can facilitate estimation of entity orientation and/or identity components in accordance with one or more embodiments described herein. In some embodiments, system 500b can provide a two-dimensional array of capacitance data (e.g., a capacitance contour map such as, for instance, capacitance map 502 described below and illustrated in FIG. 5B), and thus can enable a richer parameter extraction that can be used to identify an entity that touches pixelated touch screen 108 and/or the orientation of the touch. Repetitive description of like elements and/or processes employed in various embodiments described herein is omitted for sake of brevity.

In some embodiments, system 500a can comprise system 400a described above and illustrated in FIG. 4A. In some embodiments, system 500b can comprise a capacitance map 502 that can be generated by pixelated touch screen 108 (e.g., via capacitors 402) of system 500a depicted in FIG. 5A. In some embodiments, pixelated touch screen 108 can generate capacitance map 502 comprising capacitance data 504 based on pixelated touch screen 108 detecting a touch by finger 208a of entity 206a (e.g., entity 206a illustrated in FIGS. 2 and 3). In some embodiments, pixelated touch screen 108 of system 500b can generate a two-dimensional (2D) capacitance map, which can comprise a two-dimensional (2D) capacitance readout profile (e.g., capacitance map 502 illustrated in FIG. 5B). For instance, such a capacitance map can comprise a two-dimensional (2D) plot with two axes (e.g., x-axis and y-axis) describing coordinates (e.g., location information) and topography lines (e.g., on a z-axis) providing height information at each coordinate, where such height information can represent capacitance value(s).

In these embodiments, such a capacitance map 502 provided by pixelated touch screen 108 can comprise capacitance data 504 (e.g., contours 506) that can be utilized by input-output device 102 and/or processor 106 to estimate (e.g., as described above with reference to FIG. 1) orientation and/or identity of the entity (e.g., entity 206a) that touched pixelated touch screen 108. For example, capacitance data 504 can comprise capacitance data (e.g., capacitance values in the form of multi-dimensional contours 506 as determined by capacitors 402) that is inversely proportional to a distance between finger 208a and pixelated touch screen 108 (e.g., as illustrated by the change in shape and/or slope of contours 506 of capacitance map 502 depicted in FIG. 5B).

In the embodiment depicted in FIG. 5B, based on capacitance map 502 and/or capacitance data 504 (e.g., contours 506), input-output device 102 and/or processor 106 can estimate the orientation of entity 206a and/or finger 208a to be to the left of pixelated touch screen 108, as the change in shape and/or slope of contours 506 of capacitance map 502 in the direction toward entity 206a, and/or finger 208a is gradual, while the change in shape and/or slope of contours 506 of capacitance map 502 is steep in the opposite direction. In this embodiment, the location of such a gradual and steep change in shape and/or slope of contours 506 of capacitance map 502 can be indicative of orientation of entity 206a and/or finger 208a.

In some embodiments, capacitance map 502 can comprise one or more characteristics that can be indicative of one or more characteristics of an entity that touched pixelated touch screen 108. For example, capacitance map 502 can comprise capacitance data 504 (e.g., contours 506) that can constitute a capacitance signature of an entity that touched pixelated touch screen 108. For instance, capacitance map 502 can comprise capacitance data 504 (e.g., anomalies in the shape and/or slope of contours 506) that can be indicative of one or more characteristics unique to the entity that touched pixelated touch screen 108 (e.g., dry skin, moist skin, long finger, short finger, wide finger, narrow finger, etc.). In such embodiments, input-output device 102 and/or processor 106 can estimate (e.g., as described above with reference to FIG. 1) the identity of the entity (e.g., entity 206a) that touched pixelated touch screen 108 based on such capacitance map 502 characteristics that can be indicative of one or more characteristics of an entity that touched pixelated touch screen 108.

Figure 6:
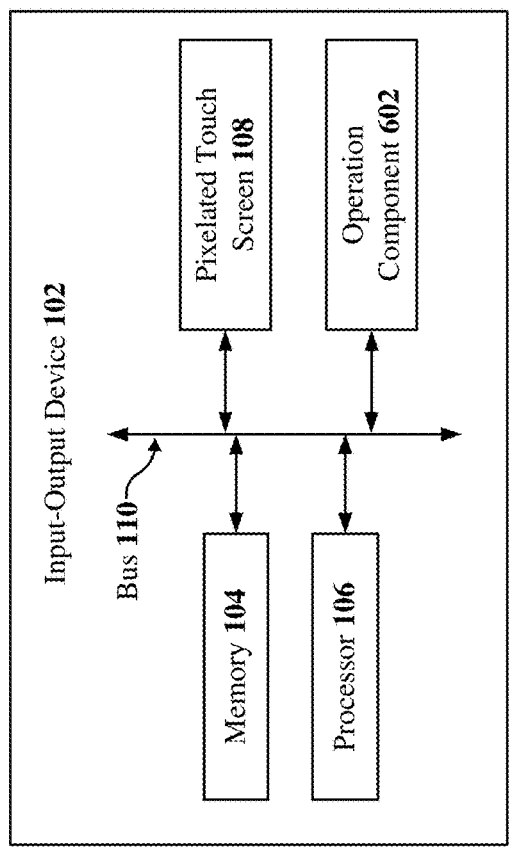
FIG. 6 illustrates a block diagram of an example, non-limiting system that can facilitate estimation of entity orientation and/or identity components in accordance with one or more embodiments described herein.

FIG. 6 illustrates a block diagram of an example, non-limiting system 600 that can facilitate estimation of entity orientation and/or identity components in accordance with one or more embodiments described herein. Repetitive description of like elements and/or processes employed in various embodiments described herein is omitted for sake of brevity. In some embodiments, system 600 can comprise input-output device 102, which can comprise operation component 602.

According to multiple embodiments, operation component 602 can execute an operation based on the orientation and/or the identity of one or more entities. For example, operation component 602 can execute an operation based on the orientation and/or the identity of one or more entities 206a, 206b as determined by input-output device 102 and/or processor 106 (e.g., as described above with reference to FIGS. 1, 2, 3, 4A, 4B, 5A, and 5B).

In some embodiments, input-output device 102 can be integrated with (e.g., electrically, communicatively, operatively, physically coupled to) a vehicle control panel system (e.g., in a car dashboard, located between the driver and the passenger). In these embodiments, such a vehicle control panel system can comprise a car control panel system comprising an entertainment system (e.g. radio, video, etc.), a communication system (e.g., Bluetooth, data communication, etc.), a navigation system (e.g., Global Positioning System (GPS) navigation), an internal climate control system, an ergonomic system (e.g., seat positioning, steering wheel positioning, mirror positioning, etc.), and/or another system. In some embodiments, based on the orientation and/or the identity of one or more entities (e.g., entities 206a, 206b), operation component 602 can execute (e.g., via processor 106) one or more operations of one or more of the car control panel systems described above (e.g., entertainment, communication, navigation, etc.). For example, based on the orientation and/or the identity of one or more entities (e.g., entities 206a, 206b), operation component 602 can execute operations including, but not limited to, changing temperature, changing fan speed, changing ergonomic settings, and/or another operation. In some embodiments, to facilitate such execution of an operation, operation component 602 can communicate such orientation and/or identity of one or more entities (e.g., entities 206a, 206b) to one or more of the car control panel systems described above, where such system(s) can execute (e.g., via a processor associated with such system(s)) an operation based on such orientation and/or identity of the one or more entities.

Figure 7:
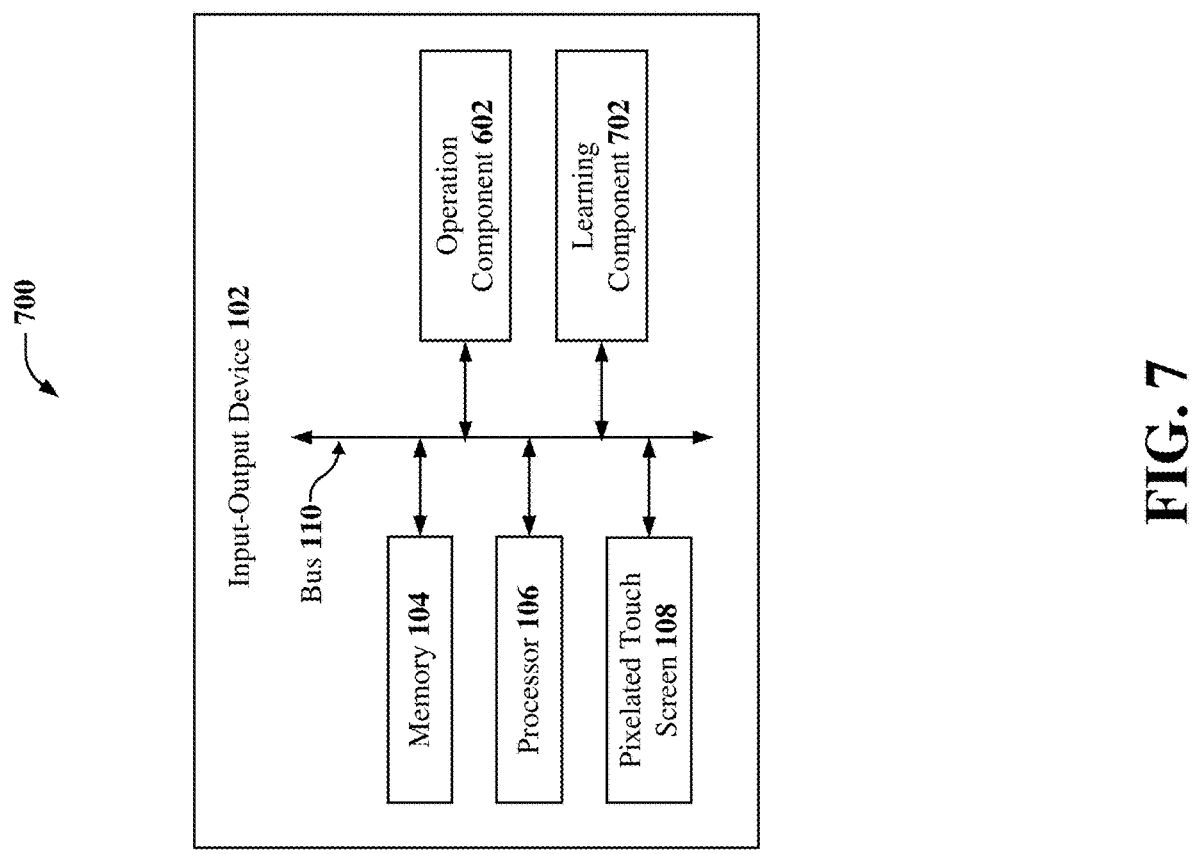
FIG. 7 illustrates a block diagram of an example, non-limiting system that can facilitate estimation of entity orientation and/or identity components in accordance with one or more embodiments described herein.

FIG. 7 illustrates a block diagram of an example, non-limiting system 700 that can facilitate estimation of entity orientation and/or identity components in accordance with one or more embodiments described herein. Repetitive description of like elements and/or processes employed in various embodiments described herein is omitted for sake of brevity. In some embodiments, system 700 can comprise input-output device 102, which can comprise learning component 702.

According to multiple embodiments, input-output device 102 and/or processor 106 can employ learning component 702 to determine over time the orientation and/or identity of one or more entities that touch pixelated touch screen 108. For example, input-output device 102 and/or processor 106 can employ learning component 702 to determine over time the orientation and/or identity of one or more entities 206a, 206b that touch pixelated touch screen 108 based on one or more characteristics of a capacitance map and/or capacitance data generated by pixelated touch screen 108 in response to such a touch instance(s).

In some embodiments, input-output device 102 and/or processor 106 can employ learning component 702 to learn a plurality of capacitance line plots, capacitance maps, and/or capacitance data corresponding to one or more touch instances of pixelated touch screen 108 by one or more entities (e.g., entities 206a, 206b). For example, input-output device 102 and/or processor 106 can employ learning component 702 to learn one or more characteristics of capacitance line plots (e.g., capacitance line plots 404a, 404b), capacitance maps (e.g., capacitance map 502), and/or capacitance data (e.g., capacitance data 406a, 406b, 504, and/or contours 506), where such characteristics can be unique to a certain entity (e.g., as described above with reference to FIGS. 5A and 5B).

In some embodiments, one or more characteristics of such capacitance maps and/or capacitance data described above can comprise training data that learning component 702 can input to a machine learning model and/or artificial intelligence model to estimate orientation and/or identity of one or more entities that touch pixelated touch screen 108. In some embodiments, learning component 702 can employ one or more machine learning models and/or artificial intelligence models to estimate orientation and/or identity of one or more entities that touch pixelated touch screen 108 based on explicit learning and/or implicit learning. For example, learning component 702 can employ one or more machine learning models and/or artificial intelligence models to estimate orientation and/or identity of one or more entities that touch pixelated touch screen 108 based on explicit learning, where previously obtained characteristics of such capacitance maps and/or capacitance data corresponding to touch instances of pixelated touch screen 108 by one or more entities can be input to learning component 702 as training data to train learning component 702 to estimate orientation and/or identity of one or more entities that touch pixelated touch screen 108. In another example, learning component 702 can employ one or more machine learning models and/or artificial intelligence models to estimate orientation and/or identity of one or more entities that touch pixelated touch screen 108 based on implicit learning, where learning component 702 can learn one or more characteristics of capacitance maps and/or capacitance data generated by pixelated touch screen 108 over time based on a plurality of touch instances by one or more entities.

In an embodiment, learning component 702 can estimate orientation and/or identity of one or more entities that touch pixelated touch screen 108 based on classifications, correlations, inferences and/or expressions associated with principles of artificial intelligence. For instance, learning component 702 can employ an automatic classification system and/or an automatic classification process to estimate orientation and/or identity of one or more entities that touch pixelated touch screen 108 based on one or more characteristics of capacitance maps and/or capacitance data corresponding to a plurality of touch instances by one or more entities. In one embodiment, learning component 702 can employ a probabilistic and/or statistical-based analysis (e.g., factoring into the analysis utilities and costs) to estimate orientation and/or identity of one or more entities that touch pixelated touch screen 108 based on one or more characteristics of capacitance maps and/or capacitance data corresponding to a plurality of touch instances by one or more entities. In another embodiment, learning component 702 can include an inference component (not illustrated in FIG. 7) that can further enhance automated aspects of learning component 702 utilizing in part inference-based schemes to estimate orientation and/or identity of an entity that touches pixelated touch screen 108 based on one or more characteristics of capacitance maps and/or capacitance data corresponding to a plurality of touch instances by one or more entities.

In some embodiments, learning component 702 can employ any suitable machine learning based techniques, statistical-based techniques, and/or probabilistic-based techniques to estimate orientation and/or identity of an entity that touches pixelated touch screen 108 based on one or more characteristics of capacitance maps and/or capacitance data corresponding to a plurality of touch instances by one or more entities. For example, learning component 702 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, learning component 702 can perform a set of machine learning computations associated with estimating orientation and/or identity of an entity that touches pixelated touch screen 108 based on one or more characteristics of capacitance maps and/or capacitance data corresponding to a plurality of touch instances by one or more entities. For example, learning component 702 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to estimate orientation and/or identity of an entity that touches pixelated touch screen 108 based on one or more characteristics of capacitance maps and/or capacitance data corresponding to a plurality of touch instances by one or more entities.

In some embodiments, input-output device 102 can be a pixelated touch screen device, system, and/or process to estimate entity orientation and/or identification that can be associated with various technologies. For example, input-output device 102 can be associated with capacitance touch screen technologies, shared touch screen technologies, pixelated touch screen technologies, vehicle control panel system technologies, vehicle entertainment system technologies, vehicle communication system technologies, vehicle navigation system technologies, vehicle climate control system technologies, vehicle ergonomic system technologies, video game technologies, graph analytics technologies, internet of things (IOT) technologies, computer technologies, server technologies, machine learning technologies, artificial intelligence technologies, system integration technologies, and/or other technologies.

In some embodiments, input-output device 102 can provide technical improvements to systems, devices, components, operational steps, and/or processing steps associated with the various technologies identified above. For example, input-output device 102 can estimate orientation and/or identity of one or more entities that touch pixelated touch screen 108, thereby facilitating a smart (e.g., intelligent) touch screen device that can provide a user interface (e.g., a GUI) having a single set of input controls (e.g., universal input controls) that can be used by multiple entities (e.g., human users), as opposed to a set of input controls for each entity. In this example, such a single set of input controls (e.g., input controls 304 described above with reference to FIG. 3) can facilitate safer operation of a vehicle (e.g., a car) in which input-output device 102 is implemented, as a driver of such vehicle can spend less time determining which button controls functions related to the driver. In this example, input-output device 102 can prevent a passenger of such a vehicle from modifying a function that should only be controlled by the driver.

In some embodiments, input-output device 102 can also provide technical improvements to a pixelated touch screen device, system, and/or process by reducing complexity, quantity of components, and/or quantity of operations of such device, system, and/or process. For example, by providing such a single set of input controls (e.g., input controls 304) as described above, input-output device 102 can facilitate reducing complexity, quantity of components, and/or quantity of operations of a pixelated touch screen device that provides multiple sets of input controls for multiple entities (e.g., a set of input controls for each entity). For instance, by providing such a single set of input controls (e.g., input controls 304), input-output device 102 can facilitate: reducing complexity of a user interface (e.g., GUI) by providing less input controls; reducing quantity of input devices; and/or reducing quantity of operations associated with multiple sets of input controls.

In some embodiments, input-output device 102 can also provide technical improvements to a pixelated touch screen device, system, and/or process by reducing memory consumption. For example, software corresponding to a user interface having a single set of input controls (e.g., input controls 304) can comprise fewer instructions and therefore require less storage space on a memory device (e.g., memory 104) than that of a user interface having multiple input controls designated to multiple entities.

In some embodiments, input-output device 102 can provide technical improvements to a processing unit (e.g., processor 106) associated with a pixelated touch screen device, system, and/or process. For example, as described above, by proving a single set of input controls (e.g., input controls 304), input-output device 102 can reduce the number of operations necessary to execute various functions associated with multiple sets of input controls. In this example, such a reduction of the number of operations reduces the processing workload and/or number of processing cycles a processing unit (e.g., processor 106) must execute, thereby facilitating improved processing performance, processing efficiency, and/or reduced processor power consumption.

In some embodiments, input-output device 102 can employ hardware and/or software to solve problems that are highly technical in nature, that are not abstract and that cannot be performed as a set of mental acts by a human. In some embodiments, some of the processes described herein may be performed by one or more specialized computers (e.g., one or more specialized processing units, a specialized computer with an entity orientation and/or identity estimation component(s), etc.) for carrying out defined tasks related to estimating entity orientation and/or identity, machine learning, and/or artificial intelligence. In some embodiments, input-output device 102 and/or components thereof, can be employed to solve new problems that arise through advancements in technologies mentioned above and/or another technology.

It is to be appreciated that input-output device 102 can perform an entity orientation and/or identity estimation process utilizing various combinations of electrical components, mechanical components, and circuitry that cannot be replicated in the mind of a human or performed by a human. For example, providing a capacitance map in response to detection of one or more entities touching a pixelated touch screen and estimating orientation and/or identity of the one or more entities based on such a capacitance map, are operations that are greater than the capability of a human mind. For instance, the amount of data processed, the speed of processing such data, and/or the types of data processed by input-output device 102, pixelated touch screen 108, operation component 602, and/or learning component 702 over a certain period of time can be greater, faster, and/or different than the amount, speed, and/or data type that can be processed by a human mind over the same period of time.

According to several embodiments, input-output device 102 can also be fully operational towards performing one or more other functions (e.g., fully powered on, fully executed, etc.) while also performing the above-referenced entity orientation and/or identity estimation process. It should be appreciated that such simultaneous multi-operational execution is beyond the capability of a human mind. It should also be appreciated that input-output device 102 can include information that is impossible to obtain manually by an entity, such as a human user. For example, the type, amount, and/or variety of information included in input-output device 102, pixelated touch screen 108, operation component 602, and/or learning component 702 can be more complex than information obtained manually by a human user.

Figure 8A:
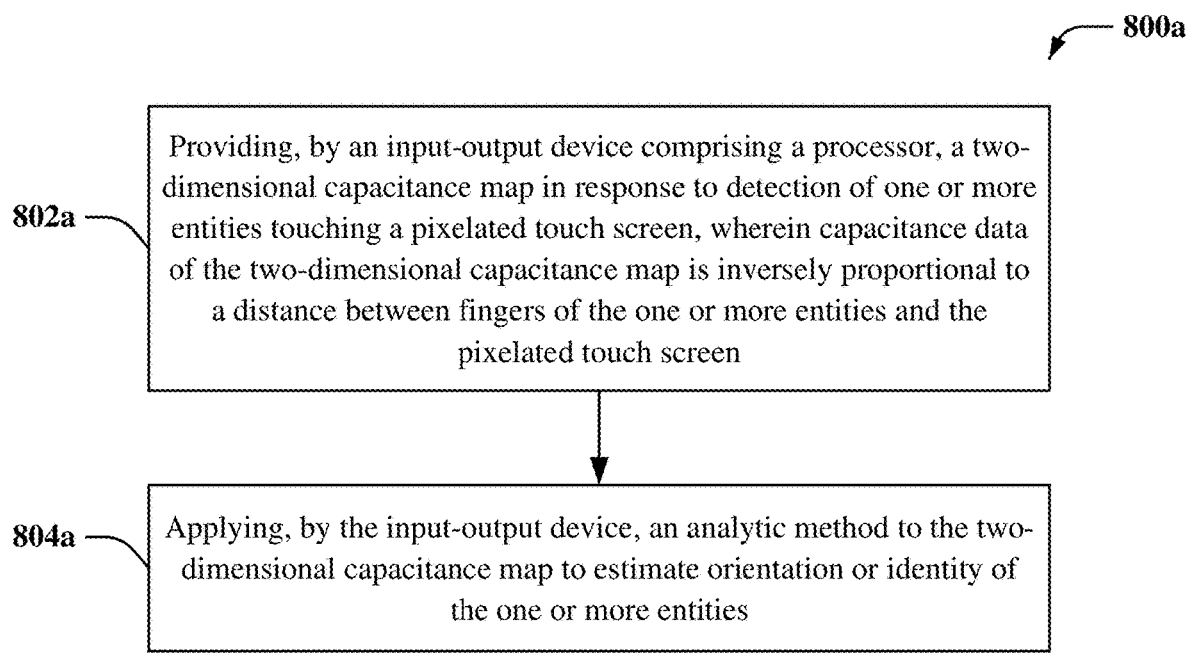
FIG. 8A illustrates a flow diagram of an example, non-limiting computer-implemented method that can facilitate estimation of entity orientation and/or identity components in accordance with one or more embodiments described herein.

FIG. 8A illustrates a flow diagram of an example, non-limiting computer-implemented method 800a that can facilitate estimation of entity orientation and/or identity components in accordance with one or more embodiments described herein. Repetitive description of like elements and/or processes employed in various embodiments described herein is omitted for sake of brevity.

At 802a, the computer-implemented method 800a can comprise providing, by an input-output device (e.g., via input-output device 102 and/or pixelated touch screen 108) operatively coupled to a processor (e.g., processor 106), a two-dimensional capacitance map (e.g., capacitance map 502) in response to detection of one or more entities (e.g., entities 206a, 206b) touching a pixelated touch screen (e.g., pixelated touch screen 108), wherein capacitance data (e.g., capacitance data 504 and/or contours 506) of the two-dimensional capacitance map is inversely proportional to a distance between fingers (e.g., fingers 208a) of the one or more entities and the pixelated touch screen.

At 804a, the computer-implemented method 800a can comprise applying, by the input-output device (e.g., via input-output device 102 and/or processor 106), an analytic method (e.g., signal processing analysis, principal component analysis, first principles analysis, machine learning model (e.g., data-driven analysis), imaging analysis, imaging based analysis, etc.) to the two-dimensional capacitance map to estimate orientation and/or identity of the one or more entities.

Figure 8B:
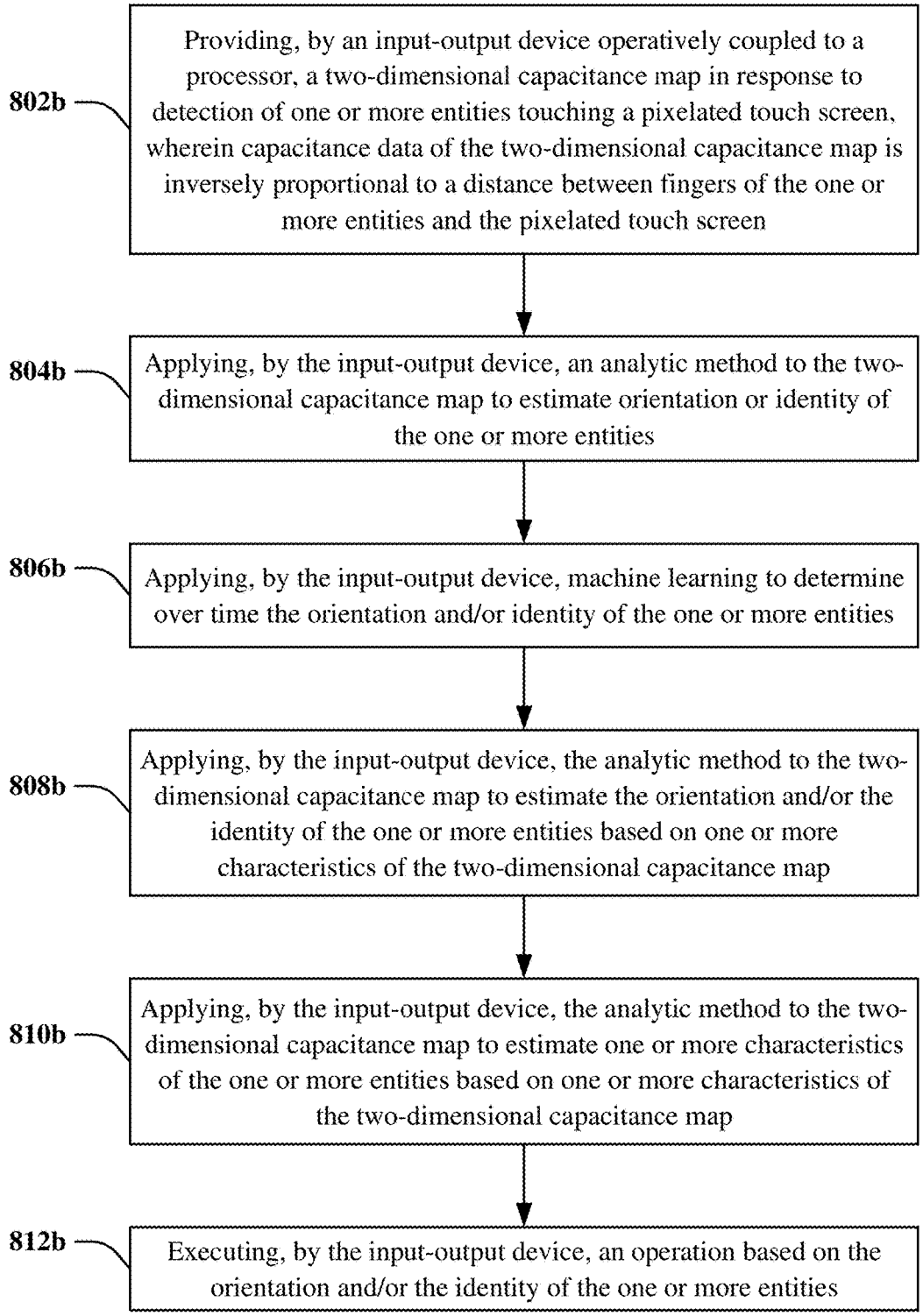
FIG. 8B illustrates a flow diagram of an example, non-limiting computer-implemented method that can facilitate estimation of entity orientation and/or identity components in accordance with one or more embodiments described herein.

FIG. 8B illustrates a flow diagram of an example, non-limiting computer-implemented method 800b that can facilitate estimation of entity orientation and/or identity components in accordance with one or more embodiments described herein. Repetitive description of like elements and/or processes employed in various embodiments described herein is omitted for sake of brevity.

At 802b, the computer-implemented method 800b can comprise providing, by an input-output device (e.g., via input-output device 102 and/or pixelated touch screen 108) operatively coupled to a processor (e.g., processor 106), a two-dimensional capacitance map (e.g., capacitance map 502) in response to detection of one or more entities (e.g., entities 206a, 206b) touching a pixelated touch screen (e.g., pixelated touch screen 108), wherein capacitance data (e.g., capacitance data 504 and/or contours 506) of the two-dimensional capacitance map is inversely proportional to a distance between fingers (e.g., fingers 208a) of the one or more entities and the pixelated touch screen.

At 804b, the computer-implemented method 800b can comprise applying, by the input-output device (e.g., via input-output device 102 and/or processor 106), an analytic method (e.g., signal processing analysis, principal component analysis, first principles analysis, machine learning model (e.g., data-driven analysis), imaging analysis, imaging based analysis, etc.) to the two-dimensional capacitance map to estimate orientation and/or identity of the one or more entities.

At 806b, the computer-implemented method 800b can comprise applying, by the input-output device (e.g., via input-output device 102, processor 106, and/or learning component 702), machine learning to determine over time the orientation and/or identity of the one or more entities (e.g., entities 206a, 206b).

At 808b, the computer-implemented method 800b can comprise applying, by the input-output device (e.g., via input-output device 102 and/or processor 106), the analytic method to the two-dimensional capacitance map to estimate the orientation and/or the identity of the one or more entities based on one or more characteristics of the two-dimensional capacitance map (e.g., as described above with reference to FIGS. 5A and 5B).

At 810b, the computer-implemented method 800b can comprise applying, by the input-output device (e.g., via input-output device 102 and/or processor 106), the analytic method to the two-dimensional capacitance map to estimate one or more characteristics (e.g., dry skin, moist skin, long finger, short finger, wide finger, narrow finger, etc.) of the one or more entities based on one or more characteristics of the two-dimensional capacitance map (e.g., anomalies in the shape and/or slope of contours 506 as described above with reference to FIGS. 5A and 5B).

At 812b, the computer-implemented method 800b can comprise executing, by the input-output device (e.g., via input-output device 102, processor 106, and/or operation component 602), an operation based on the orientation and/or the identity of the one or more entities.

FIG. 9 illustrates a flow diagram of an example, non-limiting computer-implemented method 900 that can facilitate estimation of entity orientation and/or identity components in accordance with one or more embodiments described herein. Repetitive description of like elements and/or processes employed in various embodiments described herein is omitted for sake of brevity.

At 902, the method 900 can comprise a computational method. The computational method 900 can comprise facilitating an estimation of entity orientation or identity process, using a hardware capable of performing a computation on input data in the form of a two-dimensional capacitance map obtained in response to detection of one or more entities touching a pixelated touch screen, wherein capacitance data of the two-dimensional capacitance map is inversely proportional to a distance between fingers of the one or more entities and the pixelated touch screen, and wherein the hardware output response to the two-dimensional capacitance map is an estimate of the orientation or identity of the one or more entities.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
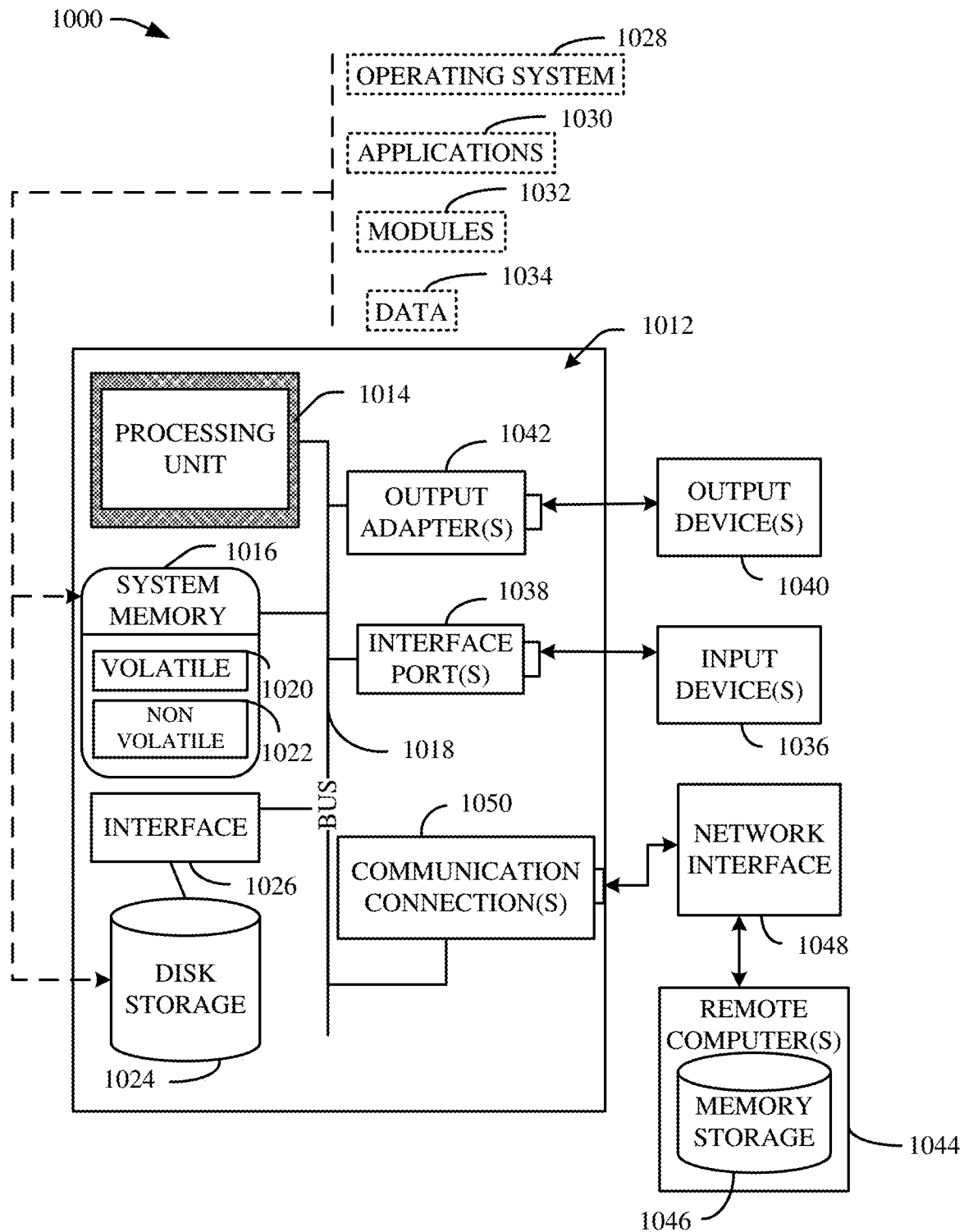
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An input-output device, comprising:
   a pixelated touch screen that generates a two-dimensional capacitance map in response to detection of one or more entities touching the pixelated touch screen, wherein capacitance data of the two-dimensional capacitance map is inversely proportional to a distance between fingers of the one or more entities and the pixelated touch screen; and
   a processor that applies an analytic method to the two-dimensional capacitance map to determine whether an entity of the one or more entities is located in a back seat of a vehicle based on matching one or more capacitance data characteristics of the entity to a portion of the capacitance data.

2. The input-output device of claim 1, wherein the analytic method comprises at least one of: a signal processing analysis; a principal component analysis; a first principles analysis; a machine learning model; or an imaging analysis.

3. The input-output device of claim 1, wherein the analytic method uses machine learning over time to learn the one or more capacitance data characteristics of the entity.

4. The input-output device of claim 1, wherein the processor determines an identity of the entity based on the analytic method.

5. The input-output device of claim 1, wherein the one or more capacitance data characteristics is representative of one or more characteristics of the entity selected from a group consisting of: skin moisture level, width of a finger, and length of the finger.

6. The input-output device of claim 1, further comprising:
   an operation component that prohibits operation by the entity of an input control of a set of input controls of a user interface displayed on the pixelated touch screen based on a result of the determination of whether the entity is located in the back seat of the vehicle.

7. The input-output device of claim 1, wherein the pixelated touch screen is selected from a group consisting of: a capacitance touch screen; a surface capacitance touch screen; a projected capacitance touch screen; a capacitance sensing touch-based input device; a capacitance sensing touch display; a capacitance sensing touch monitor; and a capacitance sensing touch pad.

8. The input-output device of claim 1, wherein the two-dimensional capacitance map is selected from a group consisting of: a capacitance readout profile; a capacitance line plot; and a two-dimensional capacitance readout profile.

9. A computer-implemented method, comprising:
generating, by an input-output device operatively coupled to a processor, a two-dimensional capacitance map in response to detection of one or more entities touching a pixelated touch screen, wherein capacitance data of the two-dimensional capacitance map is inversely proportional to a distance between fingers of the one or more entities and the pixelated touch screen; and
applying, by the input-output device, an analytic method to the two-dimensional capacitance map to determine whether an entity of the one or more entities is located in a back seat of a vehicle based on matching one or more capacitance data characteristics of the entity to a portion of the capacitance data.

10. The computer-implemented method of claim 9, wherein the analytic method comprises at least one of: a signal processing analysis; a principal component analysis; a first principles analysis; a machine learning model; or an imaging analysis.

11. The computer-implemented method of claim 9, wherein the analytic method uses machine learning over time to learn the one or more capacitance data characteristics of the entity.

12. The computer-implemented method of claim 9, further comprising determining, by the input-output device, an identity of the entity based on the analytic method.

13. The computer-implemented method of claim 9, wherein the one or more capacitance data characteristics is representative of one or more characteristics of the entity selected from a group consisting of: skin moisture level, width of a finger, and length of the finger.

14. The computer-implemented method of claim 9, further comprising:
prohibiting, by the input-output device, operation by the entity of an input control of a set of input controls of a user interface displayed on the pixelated touch screen based on a result of the determination of whether the entity is located in the back seat of the vehicle.

15. A computer program product facilitating an entity identification process, the computer program product comprising a computer readable storage medium having program instructions embodied therewith, the program instructions executable by a processor to cause the processor to:
generate a two-dimensional capacitance map in response to detection of one or more entities touching a pixelated touch screen, wherein capacitance data of the two-dimensional capacitance map is inversely proportional to a distance between fingers of the one or more entities and the pixelated touch screen; and
apply an analytic method to the two-dimensional capacitance map to determine whether an entity of the one or more entities is located in a back seat of a vehicle based on matching one or more capacitance data characteristics of the entity to a portion of the capacitance data.

16. The computer program product of claim 15, wherein the analytic method comprises at least one of: a signal processing analysis; a principal component analysis; a first principles analysis; a machine learning model; or an imaging analysis.

17. The computer program product of claim 15, wherein the analytic method uses machine learning over time to learn the one or more capacitance data characteristics of the entity.

18. The computer program product of claim 15, wherein the processor is further configured to determine an identity of the entity based on the analytic method.

19. The computer program product of claim 15, wherein the one or more capacitance data characteristics is representative of one or more characteristics of the entity selected from a group consisting of: skin moisture level, width of a finger, and length of the finger.

20. The computer program product of claim 15, wherein the processor is further configured to prohibit operation by the entity of an input control of a set of input controls of a user interface displayed on the pixelated touch screen based on a result of the determination of whether the entity is located in the back seat of the vehicle.

* * * * *